United States Patent
Laulagnet et al.

(10) Patent No.: US 8,355,303 B2
(45) Date of Patent: Jan. 15, 2013

(54) SUPER-RESOLUTION OPTICAL DISC READER AND READ METHOD OPTIMIZED THROUGH REFLECTIVITY MEASUREMENT

(75) Inventors: Fabien Laulagnet, Fontaine (FR); Marie-Françoise Armand, Vaulnaveys le Haut (FR); Alain Fargeix, Montbonnot Saint Martin (FR); Bérangère Hyot, Eybens (FR)

(73) Assignee: Commissariat a l'Energie Atomique, Paris (FR)

( * ) Notice: Subject to any disclaimer, the term of this patent is extended or adjusted under 35 U.S.C. 154(b) by 127 days.

(21) Appl. No.: 12/889,919

(22) Filed: Sep. 24, 2010

(65) Prior Publication Data

US 2011/0075531 A1 Mar. 31, 2011

(30) Foreign Application Priority Data

Sep. 29, 2009 (FR) ...................... 09 04641

(51) Int. Cl.
*G11B 20/10* (2006.01)
(52) U.S. Cl. ...................... 369/47.5; 369/53.26; 369/116
(58) Field of Classification Search ................. 369/47.5, 369/53.26, 116
See application file for complete search history.

(56) References Cited

U.S. PATENT DOCUMENTS

| | | |
|---|---|---|
| 6,430,128 B1 | 8/2002 | Kato et al. |
| 6,665,242 B2 * | 12/2003 | Nishikawa .................. 369/47.5 |
| 2005/0105418 A1 | 5/2005 | Kuwahara et al. |
| 2005/0190670 A1 * | 9/2005 | Kim et al. .................. 369/47.5 |
| 2006/0007824 A1 * | 1/2006 | Araki ......................... 369/47.53 |
| 2007/0140083 A1 | 6/2007 | Bae et al. |
| 2008/0025190 A1 * | 1/2008 | Yokoi et al. ............. 369/124.01 |
| 2008/0259778 A1 | 10/2008 | Hyot et al. |
| 2008/0273447 A1 * | 11/2008 | Hyot et al. ................. 369/275.1 |
| 2009/0034391 A1 * | 2/2009 | Aoki et al. .................... 369/100 |
| 2009/0252008 A1 * | 10/2009 | Kuijper ..................... 369/47.53 |
| 2010/0083295 A1 * | 4/2010 | Eto et al. ........................ 720/695 |
| 2010/0290328 A1 * | 11/2010 | Eto et al. ................... 369/47.53 |
| 2012/0207009 A1 * | 8/2012 | Mori et al. ............... 369/112.23 |

FOREIGN PATENT DOCUMENTS

| | | |
|---|---|---|
| EP | 1 884 939 A1 | 2/2008 |
| EP | 1 978 512 A1 | 10/2008 |
| FR | 2 912 539 A1 | 8/2008 |
| WO | 2005/078709 A1 | 8/2005 |

* cited by examiner

*Primary Examiner* — Wayne Young
*Assistant Examiner* — Brenda Bernardi
(74) *Attorney, Agent, or Firm* — Baker & Hostetler LLP

(57) ABSTRACT

The invention relates to the field of the optical recording of information on a medium, such as an optical disc. To read an optical disc in super-resolution mode, a procedure for optimizing the power of the read laser beam is implemented. This optimization is based on the observation that a correlation exists between the power allowing the disc to be read without risk in super-resolution mode and the reflectivity of the sensitive layer containing the information. The reflectivity of the optical disc is measured for several power levels of the read laser, a critical power is determined on the basis of the reflectivity measurements made, and a read power sufficiently above the critical power, so as to be well outside a range of power levels entailing risks, is selected according to the critical power.

10 Claims, 1 Drawing Sheet

SUPER-RESOLUTION OPTICAL DISC READER AND READ METHOD OPTIMIZED THROUGH REFLECTIVITY MEASUREMENT

CROSS-REFERENCE TO RELATED APPLICATION

This application claims priority to foreign French patent application No. FR 0904641, filed on Sep. 29, 2009, the disclosure of which is incorporated by reference in its entirety.

FIELD OF THE INVENTION

The invention relates to the field of the optical recording of information on a medium, such as an optical disc.

BACKGROUND OF THE INVENTION

The invention relates to the field of the optical recording of information on a medium, such as an optical disc.

The information is in principle stored on the medium in the form of physical marks that are singularities of controlled dimensions that provide an optical contrast enabling them to be read by a laser beam detection system.

The physical marks may be impressions formed by moulding of a polycarbonate substrate (for example for a DVD-ROM device)—they are then recorded once and for all. They may also be formed by zones recorded in sensitive layers through the action of a write light beam—the recording may then be reversible (possible erasure or even re-recording) or may be irreversible (no possible erasure or rewriting).

When seeking to increase the density of information recorded on an optical disc, the limitation is in general the performance of the information read device. The basic principle is that physical information written in the disc cannot be read if their size is smaller in size than the resolution limit of the optical system that will be used to read this information. Typically, with reading using a red laser of 650 nm wavelength and a numerical aperture of 0.6, it cannot normally be hoped for information smaller in size than 0.3 microns to be correctly read.

However, methods referred to as super-resolution methods have been devised for reading information having a physical size smaller than the optical resolution limit ($LR=(\lambda/4) \cdot NA$) where $\lambda$ is the resolution and NA the numerical aperture of the focussing optic of the laser. These methods are based on the non-linear optical properties of certain materials. The "non-linear properties" is understood to mean that certain optical properties of the material change with the intensity of the light that they receive. The read laser itself will locally modify the optical properties of the material through thermal, optical, thermooptical and/or optoelectronic effects over smaller lengths than the size of the read laser spot. Because of the change in property, information present in this very small volume becomes detectable, whereas it would not be detectable without this change.

The phenomenon exploited is based mainly on two properties of the read laser that will be used:
 firstly, the laser is focused very strongly so as to have an extremely small section (of the order of the wavelength), but the power distribution of which is gaussian, being very strong at the centre but highly attenuated on the periphery; and
 secondly, a read laser power is chosen such that the power density over a small portion of the section, at the centre of the beam, significantly modifies an optical property of the layer, whereas the power density outside this small portion of the section does not significantly modify this optical property, the optical property being modified in a direction aimed at reading information that would not be able to be read without this modification.

For example, in the case of super-resolution discs, the reflectivity is locally increased over a zone smaller than the diameter of the laser beam. It is this modification due to the non-linear optical properties that will allow smaller marks, which are not normally detectable, to be read.

In a prior patent application, filed in France under the number FR 07/00938 on 9 Feb. 2007, (publication FR 2912539), an optical storage structure operating in super-resolution mode was proposed. This structure comprises a substrate (preferably made of polycarbonate) provided with physical marks, the geometric configuration of which defines the recorded information, a superposition of three layers above the marks of the substrate, and a transparent protective layer above this superposition, the superposition comprising an indium antimonide or gallium antimonide layer inserted between two dielectric layers of a zinc sulphide-silicon oxide ($ZnS$—$SiO_2$) compound.

This structure is favourable because it requires a relatively low read laser power to read the information in super-resolution mode with a satisfactory signal/noise ratio. Now, the question of the read power is critical since, on the one hand, a high enough power is necessary to obtain a super-resolution effect by locally changing the optical properties, but, on the other hand, too high a power has a tendency for the recorded information to be gradually destroyed, limiting the number of possible read cycles, whereas it is desirable to have as large a number of read cycles as possible.

By carrying out trials on these structures based on InSb or GaSb between two $ZnS$—$SiO_2$ layers, it has however been found that the choice of read power is not simple, in that super-resolution readout is not possible with too low a power, while excessively high power is unnecessary or threatens the preservation of the information or even of the optical medium, and it seems that there is an intermediate power zone, below the optimum power that allows super-resolution readout, for which the stored information is irremediably degraded by the read laser.

This observation was made based on repeated measurements on specimens having uniformly distributed marks recorded in super-resolution.

It is therefore desirable to provide an optical information read system having means for optimizing the read laser power while taking into account this risk of irreversible degradation of the information for intermediate power levels below this optimum power. Furthermore, it is desirable for these means themselves not to involve a read power that lies in the degradation risk zone.

SUMMARY OF THE INVENTION

The invention provides an optical disc reader comprising a read laser operating in super-resolution mode, suitable for reading optical discs having a structure comprising a substrate provided with physical marks, the geometrical configuration of which defines the recorded information, a superposition of three layers above the marks of the substrate, and a transparent protective layer above this superposition, the superposition comprising an indium antimonide or gallium antimonide layer inserted between two dielectric layers of a zinc sulphide-silicon oxide compound ($ZnS$—$SiO_2$), the reader being characterized in that it comprises means for varying the power of the read laser, means for measuring a reflectivity of a sensitive layer of the optical disc for at least four power levels emitted by the read laser, calculating means, for determining, in a plane representative of the reflectivity as a function of the power, a critical power ($P_{deg}$) located at the point of intersection of a straight line joining the reflectivity measurements for two power levels and a straight line joining the reflectivity measurements for two other power levels, and a desirable read power above the critical power, and means for applying this power for subsequently reading the information present on the disc.

Preferably, the calculating means comprise means for selecting a read power equal to k times the critical power ($P_{deg}$), k being a number equal to at least 1.1 and preferably between 1.1 and 1.4.

The reflectivity measurements may be carried out for two power levels below an indicative power ($P_{ind}$) specified by the manufacturer of the reader or of the disc, and for two power levels above this setpoint power.

Preferably, the reflectivity measurement is carried out in a dedicated zone of the optical disc, this zone containing no useful information other than what is necessary for the measurement, the reflectivity measurements and the selection of a read power preferably being repeated at each new insertion of a disc into the reader.

The invention also relates to a read method corresponding to these principles. The method according to the invention includes a measurement of the reflectivity of the optical disc for at least four power levels of the read laser, a determination of a critical power ($P_{deg}$) according to the reflectivity measurements carried out, and the selection, depending on the critical power, of a read power ($P_{read}$) above the critical power for subsequently reading the information contained in the disc.

BRIEF DESCRIPTION OF DRAWINGS

Other features and advantages of the invention will become apparent on reading the following detailed description given with reference to the appended drawings in which.

DETAILED DESCRIPTION

Figure 1:
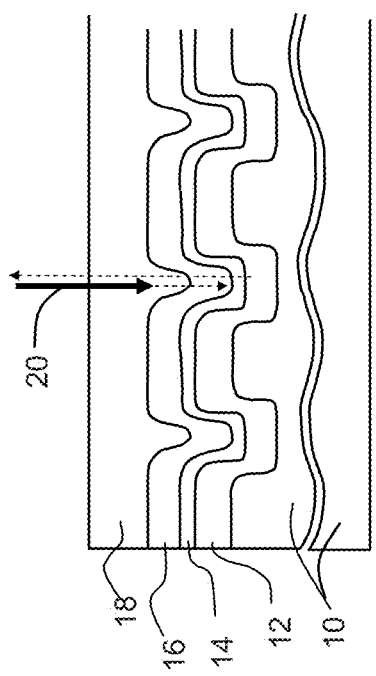
FIG. 1 shows an example of the structure of an optical disc.

FIG. 1 shows the general structure of an optical disc that can be read in super-resolution mode. It comprises a substrate 10 which is preferably made of an organic material, and notably of polycarbonate conventionally used for optical discs. Information is conventionally written into the disc on approximately concentric tracks, a read laser beam, shown symbolically by the arrow 20, placed in front of the disc, seeing the information running past it as the disc rotates.

The substrate 10 contains physical marks defining the recorded information, and in this example the physical marks are in the form of a relief imprinted on the upper surface of the substrate. For example, the relief consists of pits, the width of which is approximately constant for all the written information, but the length and the spacing of which, in the run direction of the information, define the content of the information written thereon. The information is read by analysing the phase of the laser beam reflected by the structure, which phase varies at the start and at the end of the passage of each physical mark. The pits may be pre-recorded by pressing the polycarbonate or the plastic substrate, for example using a nickel mould that has been produced using very high-resolution electron-beam etching tools.

Figure 2:
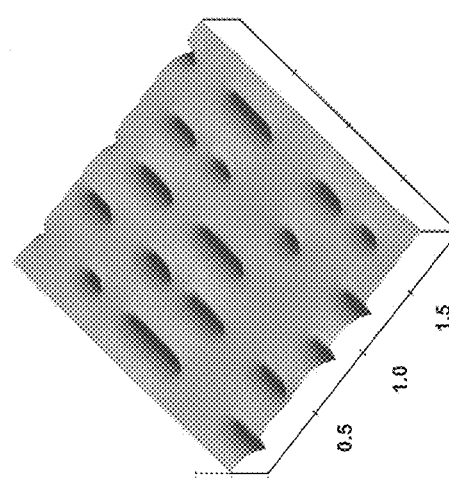
FIG. 2 shows a view, using an atomic force microscope, of a substrate in which marks having a minimum length of 80 nanometres and spaced apart by a minimum of 80 nanometres have been preformed.

The width, length and spacing of the physical marks may be below the theoretical optical resolution of the optical read system that will serve for reading them. Typically, this is a blue laser about 400 nanometre wavelength, used with a focusing optic having a numerical aperture of 0.85, the theoretical physical resolution limit being around 120 nanometers when taking precautions. Here, the marks may be pre-recorded with a resolution, in terms of length or spacing, of less than 80 nanometers. FIG. 2 shows a schematic view of the recessed physical marks recorded in this way on a disc.

In the case of a conventional optical disc, the relief (pits or bumps) would be covered with a simple layer of aluminium, but this aluminium layer would not allow a blue laser to detect marks with a length and spacing equal to 80 nanometres.

To allow such detection, the marks are covered with a sensitive structure allowing super-resolution detection. The structure comprises three layers consisting, in the following order, of a dielectric layer 12 of $ZnS$—$SiO_2$ compound, an indium antimonide (InSb) or gallium antimonide (GaSb) layer 14 and a dielectric layer 16 of $ZnS$—$SiO_2$ compound. The three-layer assembly is covered with a transparent protective layer 18. The InSb or GaSb layer 14 is a layer having non-linear optical properties.

Such a disc may be read by a reader comprising a blue laser emitting a beam with a power of about 1 to 3 milliwatts (corresponding in practice to a power density of about 7 milliwatts per square micron).

However, the sensitive structure is fragile and it has been found that the written information could be degraded for certain power level ranges, either power levels that are too high or even those below the necessary power for being able to read in super-resolution mode. It is therefore necessary to try to stop the read laser emitting at a power level causing a risk of degradation. The disc reader manufacturer will in principle provide for the laser to operate at a power that minimises the risks. The power will therefore be calibrated according to the disc manufacturer's specification or standards relating to such discs, when they exist.

However, such a calibration does not optimize the choice of power level if there may be variations in the optimum power depending on the manufacturer or on the industrial fabrication process, or even depending on the series manufactured by the same manufacturer and by the same process.

By carrying out experiments on sensitive structures allowing super-resolution operation, it has been found that there is a relationship between the reflectivity of the sensitive layer and the power emitted by the read laser beam—the reflectivity increases slowly with power for the low power levels that prevent super-resolution readout, while it increases much more rapidly for the higher power levels that allow such reading. Furthermore, there is an intermediate power zone in which the rate of variation is not steady but gradually increases.

Figure 3:
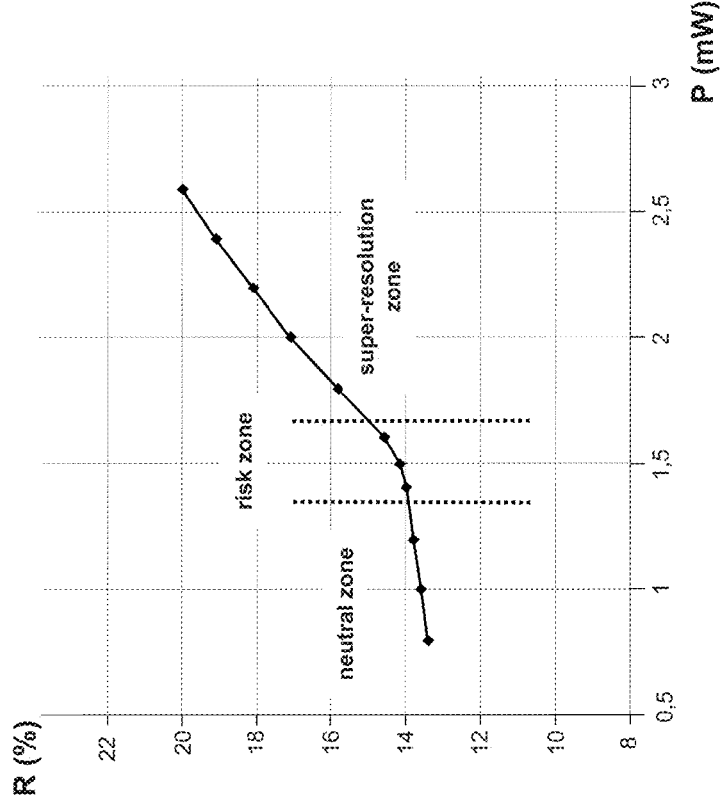
FIG. 3 shows a measured reflectivity curve of this structure as a function of the power of the read laser.

FIG. 3 shows a curve of the reflectivity of the sensitive layer as a function of the power of the emitted read laser beam. The power is in milliwatts and the reflectivity is the ratio of the reflective power to the emitted power expressed as a percentage, the laser beam emitting at a wavelength of 405 nanometres. For the sensitive layer corresponding to this curve, super-resolution readout is possible above a power of about 1.5 milliwatts, whereas below this power it is not possible to read the marks that are too small because of the absence of the super-resolution effect. Now, it has been found that the slope of the variation in reflectivity as a function of the power is in general relatively gentle in the zone below 1.5 milliwatts and is relatively steep in the zone above 1.5 milliwatts. A correlation may be observed between the possibility of super-resolution readout and the reflectivity.

Moreover, it has been observed that the zone in which the reflectivity changes slope corresponds precisely to a risk zone, in the sense that the read laser having a power lying in this zone runs the risk of the written information being irremediably degraded, for reasons due to heat-up of the material and to optical effects that as yet are poorly understood. The risk zone lies between about 1.2 milliwatts and 1.7 milliwatts, in which zone it has been found that the change in slope of the curve representing the reflectivity as a function of the power of the read laser varies most rapidly.

According to the invention, the disc reader is provided with means for measuring the reflectivity of the sensitive layer, enabling the disc to be read in super-resolution mode, means for varying the transmitted power, calculation means for determining a desirable power according to the reflectivity measurements, and means for applying this power for subsequently reading the information present on the disc.

The reflectivity of the sensitive layer is therefore measured for a set of measurement points and the position of the risk zone is deduced therefrom, a power level outside the risk zone then being able to be selected.

The preferred method consists in measuring the reflectivity for two low-power levels (located in principle below the risk zone), in measuring the reflectivity for two high power levels (located in principle above the risk zone), in determining the point of intersection of the straight lines defined by the first two measurements and by the other two measurements, this point of intersection corresponding to a power that will be called the degradation power $P_{deg}$ that lies fully within the risk zone, and finally in selecting a read power $P_{read}$ sufficiently above $P_{deg}$ so as to be clearly above the risk zone. The selection of the read power $P_{read}$ consists in practice in choosing $P_{read}=kP_{deg}$, k being a coefficient greater than 1.2 and preferably between 1.2 and 1.5.

By carrying out a reflectivity measurement on power levels lying in principle outside the risk zone, there is no possibility of applying a power that would degrade the material of the sensitive layer.

The method is preferably the following:
the indicative power $P_{ind}$, given by the optical disc manufacturer as being the power entailing a significant risk of degradation is noted, this power being for example $P_{ind}=1.5$ milliwatts;
the reflectivity is measured for at least two power levels $Pm_1$ and $Pm_2$ lying well below the indicative power $P_{ind}$ and for at least two other power levels $Pm_3$ and $Pm_4$ located well above the indicative power $P_{ind}$;
a straight line representing an approximation of the linear variation in reflectivity for low power levels is deduced from the first two measurements and a straight line representing the variation in reflectivity for high power levels is deduced from the other two measurements; the point of intersection of these two straight lines is determined and it is considered that the power corresponding to this point is a power $P_{deg}$ that represents the degradation power more precisely, when the indicative power $P_{ind}$ is not exact; and
from the power $P_{deg}$ thus determined, a read power $P_{read}$ equal to $kP_{deg}$ is selected, in which k is a multiplicative coefficient greater than 1, making it possible to ensure that the read power is clearly outside the degradation zone.

The coefficient k is greater than 1.1 and is preferably between 1.1. and 1.4. Typically, it may be 1.2.

The low measurement power levels may typically be $Pm_1=k_1 P_{ind}$ and $Pm_2=k_2 P_{ind}$, with $k_1$ and $k_2$ between 0.3 and 0.8 and with $k_2/k_1$ preferably greater than 1.1, the high measurement power levels being $Pm_3=k_3 P_{ind}$ and $Pm_4=k_4 P_{ind}$, with $k_3$ and $k_4$ between 1.20 and 1.6 and $k_4/k_3$ preferably greater than 1.1.

In the example of the photosensitive layer having the reflectivity variation curve shown in FIG. 3 and an indicative degradation power $P_{ind}=1.5$ milliwatts, the following values would for example be taken: $Pm_1=0.8$ mW, $Pm_2=1.2$ mW, $Pm_3=1.8$ mW, and $Pm_4=2.4$ mW. The point of intersection of the lines is found for a power $P_{deg}=1.4$ mW.

If for example k is chosen to be equal to 1.3, a read power $P_{read}=1.82$ milliwatts will be selected. A coefficient k of 1.5 would give a greater safety margin to be outside the risk zone, and a read power of 2.1 mW would be selected.

Experimental measurements on commercially available sensitive layer structures would make it possible to known what value of k would ensure a level of safety sufficient to take into account the disc manufacturing dispersion. Too small a value of k would run the risk of giving a read power not sufficiently outside the degradation zone. Too high a value of k would give an excessive read power in relation to the requirements for reading in super-resolution mode.

The tests are carried out in an optical disc zone reserved for this purpose, containing no useful information but having physical marks with a predetermined pattern that are recorded in super-resolution mode, or else not having any marks at all.

The measurements are made with the disc rotating at a speed that corresponds to the normalized linear speed (typically a speed giving a data rate of 66 Mbits/second). If the disc has to be read at a higher speed, a test has to be carried out at a higher speed, since the optimum power depends on the speed at which the marks run under the laser beam. More generally, a test at several speeds is recommended.

For example, the test should be carried out at each new insertion of an optical disc into the reader.

The invention claimed is:
1. An optical disc reader comprising:
a read laser operating in super-resolution mode, suitable for reading optical discs having a structure comprising:
a substrate provided with physical marks having a geometrical configuration that defines recorded information;
a superposition of three layers positioned above the physical marks of the substrate; and
a transparent protective layer positioned above the superposition of three layers, wherein the superposition of three layers comprises an indium antimonide or gallium antimonide layer inserted between two dielectric layers of a zinc sulfide-silicon oxide compound;
means for varying power of the read laser;
means for measuring a reflectivity of a sensitive layer of an optical disc for at least four power levels;
means for determining, in a plane representative of the reflectivity measurement as a function of the power of the read laser, a critical power located at a point of intersection of a straight line joining the reflectivity measurements for two power levels of the read laser and a straight line joining the reflectivity measurements for two other power levels of the read laser, and a desirable read power above the critical power; and means for applying the desirable read power for subsequently reading the recorded information present on the optical disc.

2. The disc reader according to claim 1, wherein the means for determining further comprise means for selecting a read power equal to k times the critical power, k being a number equal to at least 1.1 and preferably between 1.1 and 1.4.

3. The disc reader according to claim 2, wherein the reflectivity measurements are carried out for two power levels below an indicative power specified by a manufacturer of the disc reader or of the optical disc, and for two power levels above the indicative power.

4. The disc reader according to claim 1, wherein the means for measuring the reflectivity are designed to take the reflectivity measurement in a dedicated zone of the optical disc read by the disc reader, wherein the dedicated zone contains no useful information other than reflectivity intended to be measured.

5. The disc reader according to claim 1, wherein the means for measuring reflectivity, the means for determining and the means for applying the desirable read power to the read laser are designed to measure, calculate and apply the desirable read power at each new insertion of an optical disc into the disc reader.

6. A method of reading an optical disc by means of a read laser operating in super-resolution mode comprising:
   reading optical discs; wherein the optical discs comprise:
      a substrate provided with physical marks having a geometrical configuration that defines recorded information;
      a superposition of three layers positioned above the physical marks of the substrate; and
      a transparent protective layer positioned above the superposition of the three layers, wherein the superposition of three layers comprises an indium antimonide or gallium antimonide layer inserted between two dielectric layers of a zinc sulfide-silicon oxide compound;
   measuring a reflectivity of an optical disc for at least four power levels of the read laser;
   determining a critical power located, in a plane representative of the reflectivity measurements as a function of the power of the read laser, at a point of intersection of a straight line joining the reflectivity measurements for lowest two power levels and a straight line joining the reflectivity measurements for highest two power levels and
   selecting a read power above the critical power for subsequently reading recorded information contained in the optical disc.

7. The method according to claim 6, wherein selecting the read power comprises selecting a power equal to k times the critical power, k being a coefficient equal to at least 1.1 and preferably between 1.1 and 1.4.

8. The method according to claim 6, wherein the reflectivity measurements are made for two power levels below an indicative power specified by a manufacturer of the disc reader or of the optical disc, and for two power levels above the indicative power.

9. The method according to claim 6, wherein the reflectivity measurement is carried out in a dedicated zone of an optical disc read by the disc reader, wherein the dedicated zone contains no useful information intended to be read in subsequent read operations at the selected read power.

10. The method according to claim 6, wherein the measuring step, the determining critical power step and the selection of a read power step are carried out at each new insertion of an optical disc into the disc reader.

* * * * *